(12) United States Patent
Edmunds et al.

(10) Patent No.: US 11,845,536 B2
(45) Date of Patent: Dec. 19, 2023

(54) TELESCOPING TRACK SYSTEM FOR AERODYNAMIC SURFACES

(71) Applicant: THE BOEING COMPANY, Chicago, IL (US)

(72) Inventors: Matthew Edmunds, Seattle, WA (US); Robert Hoffenberg, Seattle, WA (US); Gregory M. Santini, Bothell, WA (US); Steven P Walker, Arlington, WA (US)

(73) Assignee: The Boeing Company, Arlington, VA (US)

( * ) Notice: Subject to any disclaimer, the term of this patent is extended or adjusted under 35 U.S.C. 154(b) by 63 days.

(21) Appl. No.: 17/385,603

(22) Filed: Jul. 26, 2021

(65) Prior Publication Data

US 2023/0026241 A1    Jan. 26, 2023

(51) Int. Cl.
| | | |
|---|---|---|
| *B64C 13/30* | (2006.01) | |
| *B64C 3/18* | (2006.01) | |
| *B64C 9/14* | (2006.01) | |
| *B64C 13/38* | (2006.01) | |
| *B64C 9/16* | (2006.01) | |
| *B64C 9/22* | (2006.01) | |

(52) U.S. Cl.
CPC .............. *B64C 13/30* (2013.01); *B64C 3/187* (2013.01); *B64C 9/14* (2013.01); *B64C 9/16* (2013.01); *B64C 13/38* (2013.01); *B64C 9/22* (2013.01)

(58) Field of Classification Search
CPC ................ B64C 9/22; B64C 9/24; B64C 9/26
See application file for complete search history.

(56) References Cited

U.S. PATENT DOCUMENTS

| | | | |
|---|---|---|---|
| 2012/0312932 A1* | 12/2012 | Hue .......................... | B64C 9/22 244/214 |
| 2018/0086432 A1* | 3/2018 | Schlipf ................. | B64C 13/341 |
| 2021/0163121 A1* | 6/2021 | Schlipf ..................... | B64C 3/50 |

* cited by examiner

*Primary Examiner* — Timothy D Collins
*Assistant Examiner* — Brendan Kroger Schneider
(74) *Attorney, Agent, or Firm* — Patterson + Sheridan, LLP

(57) ABSTRACT

Certain aspects of the present disclosure provide techniques for an aerodynamic surface actuation system, including: a middle track connected to an aerodynamic surface and configured to move along a plurality of intermediate tracks, wherein one or more inner surfaces of the middle track are configured to interface with one or more outer surfaces of the plurality of intermediate tracks; a plurality of outer tracks, each including a flange and configured to interface with one or more inner surfaces of the plurality of intermediate tracks; and an actuator configured to control a position of the middle track and a position of the plurality of intermediate tracks via a plurality of linkages.

20 Claims, 9 Drawing Sheets

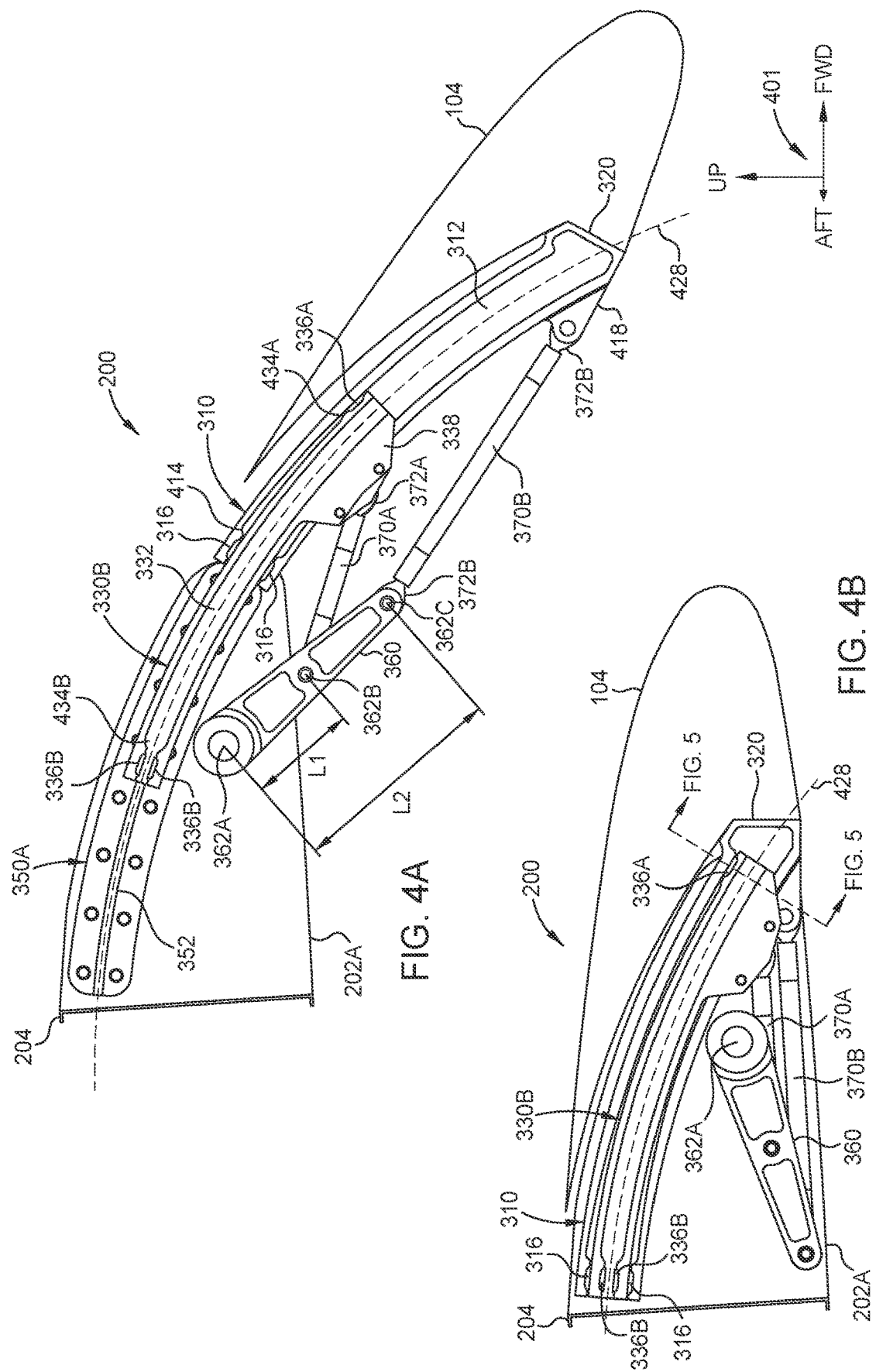

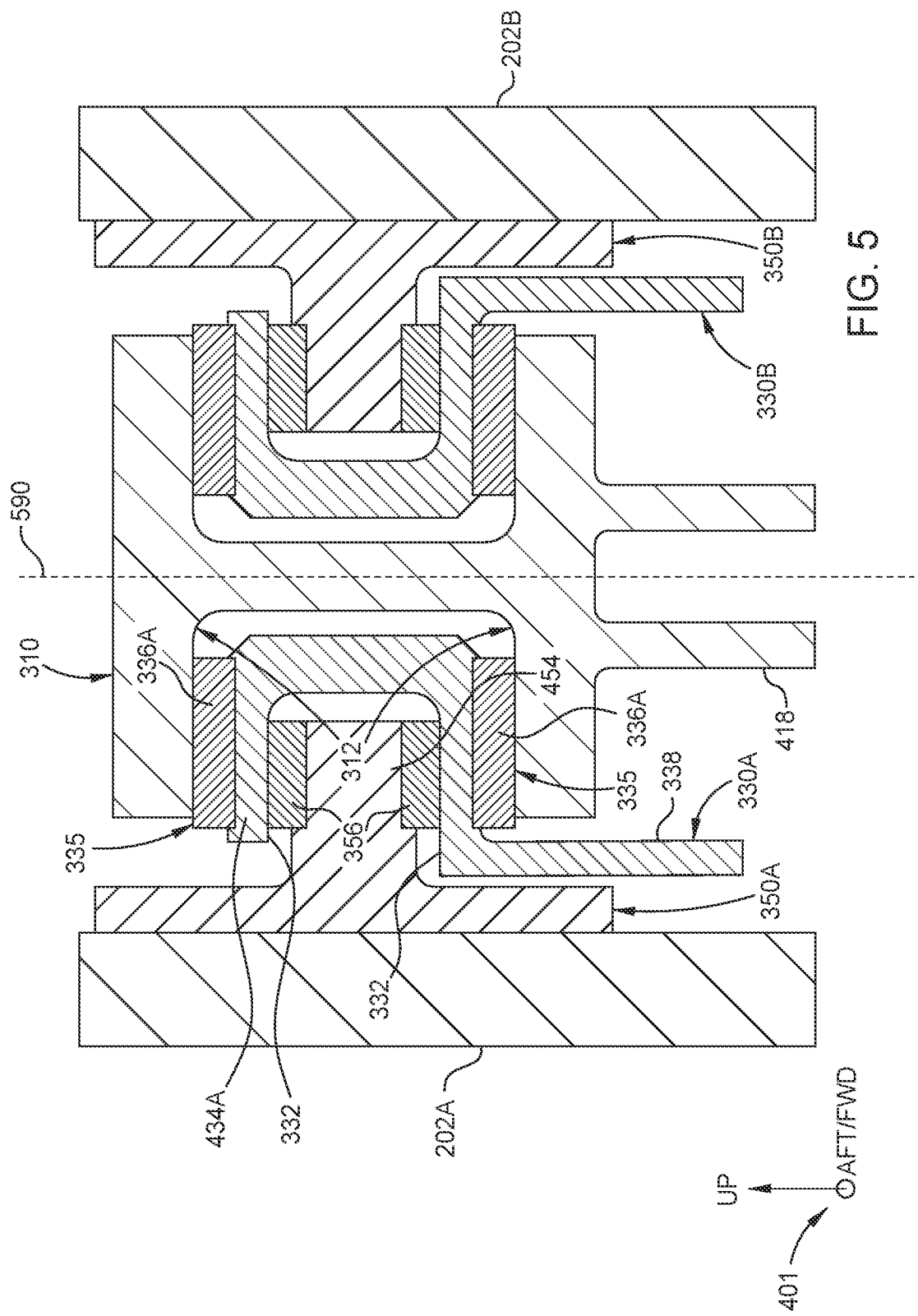

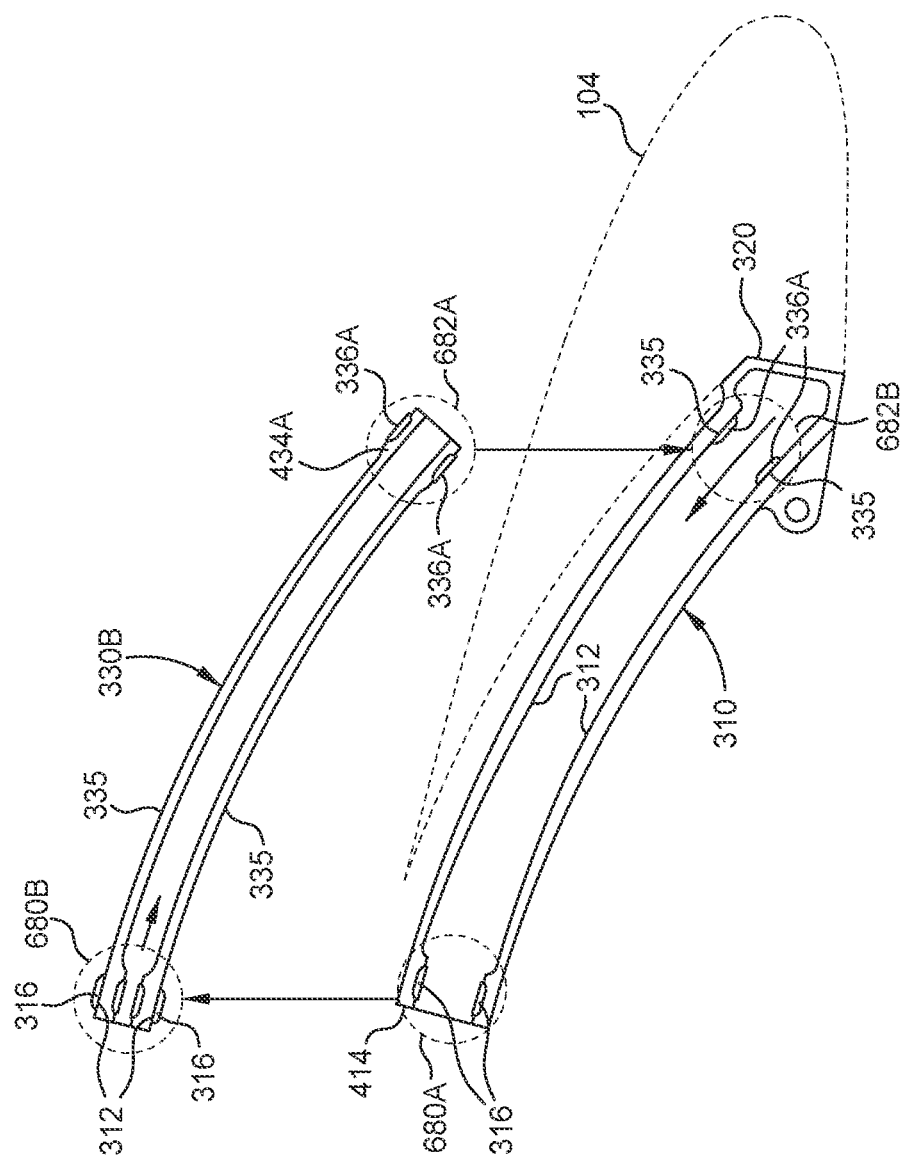

TELESCOPING TRACK SYSTEM FOR AERODYNAMIC SURFACES

FIELD

This disclosure relates generally to an actuation system for controlling the positioning of aerodynamic surfaces.

BACKGROUND

Conventional actuation systems for extending and retracting aerodynamic surfaces use single body tracks to extend and retract the surfaces. For example, leading edge slats of an aircraft are supported by the single body tracks when extended from a leading edge of a wing. Each single body track is disposed in the leading edge and connects the slat to the wing. However, the length required for the single body tracks to extend the slat is often greater than the space available inside the leading edge. Conventional systems use local penetrations in the wing spar to overcome this spatial issue. The penetrations allow the tracks to pass through the wing spar and into the main wing box cavity, which is on an aft side (or trailing edge side) of the wing spar. This is undesirable for several reasons.

First, the main wing box cavity may store fuel for the aircraft. Thus, to prevent the fuel from flowing through the penetrations and into the leading edge, the penetrations may be sealed with slat cans. The slat cans are configured to seal off the leading edge from the main wing box and surround the track when the track is retracted inside the main wing box. However, the seal around the slat cans may wear out over time, allowing fuel into the leading edge area. Second, the penetrations reduce the strength of the wing spar and require structural reinforcement of the spar surrounding the slat cans, which increases the weight of the aircraft and hardware necessary for building and maintaining the aircraft. Third, the slat can may be hard to manufacture and install because of dimensions of the slat can and limited space in the installation location. For example, the dimensions of the slat cans may interfere with surrounding features inside the main wing box. Thus, the slat can may contact the surrounding features causing damage to the features or the slat cans. In addition to the disruption of the spar structure, slat cans also are problematic for solving electrical isolation issues (EME) in carbon fiber wings.

Accordingly, there is a need for an aerodynamic surface actuation system that can fit entirely inside constrained spaces, such as inside the leading edge of an airplane, while maintaining the ability to fully extend and fully retract the aerodynamic surface.

SUMMARY

Certain embodiments provide an aerodynamic surface actuation system. The system comprises a middle track connected to an aerodynamic surface and configured to move along a plurality of intermediate tracks, wherein one or more inner surfaces of the middle track are configured to interface with one or more outer surfaces of the plurality of intermediate tracks; a plurality of outer tracks, each comprising a flange and configured to interface with one or more inner surfaces of the plurality of intermediate tracks; and an actuator configured to control a position of the middle track and a position of the plurality of intermediate tracks via a plurality of linkages.

Other aspects provide another aerodynamic surface actuation system. The system comprises a plurality of first tracks, wherein each first track of the plurality of first tracks comprises a flange, and is mounted to a longitudinal structural element in an aerodynamic structure; a plurality of second tracks, wherein each respective second track of the plurality of second tracks comprises a channel configured to receive a flange of at least one first track of the plurality of first tracks, comprises one or more inner bearing pads configured to provide a low friction interface between the channel of the respective second track and the flange of the at least one first track, and comprises one or more outer bearing pads configured to provide a low friction interface between the respective second track and a third track; and the third track connected to an aerodynamic surface and configured to interface with and move along a plurality of outer surfaces of at least two second tracks of the plurality of second tracks, wherein the third track comprises one or more inner bearing pads configured to provide low friction interfaces between the third track and the at least two second tracks.

Other aspects provide a method of actuating an aerodynamic surface. The method comprises moving a middle track connected to an aerodynamic surface along a plurality of intermediate tracks, wherein one or more inner surfaces of the middle track interface with one or more outer surfaces of the plurality of intermediate tracks; and moving the plurality of intermediate tracks along a plurality of outer tracks, wherein each outer track of the plurality of outer tracks comprises a flange configured to interface with one or more inner surfaces of the plurality of intermediate tracks.

The following description and the related drawings set forth in detail certain illustrative features of one or more embodiments.

DESCRIPTION OF THE DRAWINGS

The appended figures depict certain aspects of the one or more embodiments and are therefore not to be considered limiting of the scope of this disclosure.

FIGS. 4A and 4B depict side plan views of an aerodynamic surface actuation system in a fully extended and a fully retracted position, respectively, according to another example of the present disclosure.

FIG. 5 depicts a cross-sectional view of an aerodynamic surface actuation system according to the example embodiment from FIG. 4B of the present disclosure.

FIG. 6 depicts bearing pads of a middle track and an intermediate track, according to another example of the present disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1A:
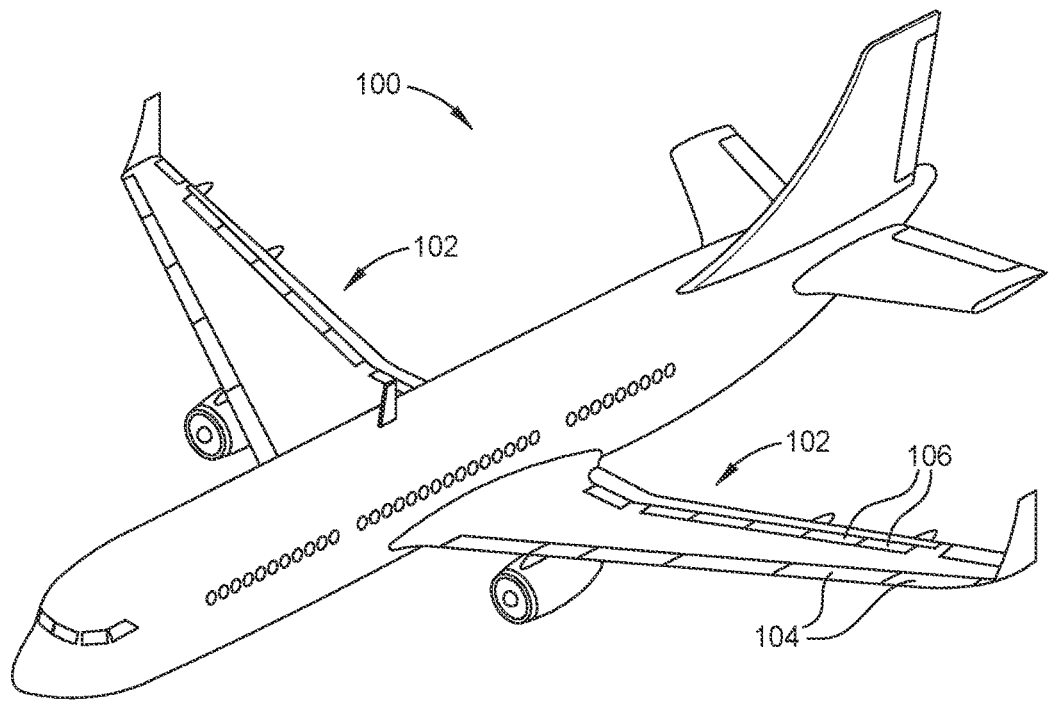
FIG. 1A depicts an aircraft with extendable aerodynamic surfaces, according to an example of the present disclosure.

Aspects of the present disclosure provide an aerodynamic surface actuation system that can fit entirely inside constrained spaces while maintaining the ability to fully extend and fully retract the aerodynamic surface to a plurality of operating positions.

According to one aspect, the surface actuation system connects to a leading edge slat of an airplane and is disposed inside a leading edge of a wing. The surface actuation system extends the leading edge slat forward and away from the wing to increase the camber of the wing and result in higher angles of attack of the wing. The higher angles of attack provide an increased lift for the aircraft at lower speeds, such as during take-off and landing. The surface actuation system also retracts the leading edge slat towards the wing to a fully retracted position when the higher angles of attack are not desired. Other aspects may instead control another aerodynamic surface, such as a trailing edge flap, or the like.

A shortcoming of conventional actuation systems is that they may not fit within the space available when fully retracted and thus require modification of surrounding structures. As an example of this, consider a conventional actuation system that uses a plurality of single body tracks to extend and retract the slats of a wing, such as depicted and described below with respect to FIG. 1B. Here, the single body tracks are disposed inside the leading edge of the wing and are typically have a length long enough to extend the slat a required distance away from the wing to maintain a desired camber of the wing. However, the space available inside the leading edge, between the slat and a wing spar, is limited and often shorter than the length of the single body track needed to extend the slat. Thus, the conventional, single body tracks must extend through the wing spar when the slats are in a fully retracted position, requiring penetrations in the wing spar for the single body tracks to extend through. Further, there may be fuel on a side of the wing spar opposite the leading edge. The penetrations must be sealed and reduce the strength of the wing spar. Thus, additional seals and structural reinforcement are needed, increasing a complexity and a weight of the aircraft.

The surface actuation system described herein addresses these issues by using a telescoping track system having multiple tracks. The telescoping configuration of the tracks allows the system to fit within the space available inside the aircraft. For example, the system fits inside the leading edge when the slat is in a fully retracted position without penetrating the wing spar. The tracks also extend the slat the required distance away from the wing to maintain the desired camber of the wing.

While leading edges and slats are discussed, they are only examples of an aerodynamic surface that can be used with the surface actuation system and other aerodynamic surfaces are possible. For example, the surface activation system extends a flap from a trailing edge of the aircraft. Thus, the discussion of leading edges and slats is not meant to be limiting.

Example Vehicle with Extendable Surfaces

FIG. 1A depicts an aircraft 100 with extendable aerodynamic surfaces, according to an example of the present disclosure.

As shown, the aircraft 100 has two wings 102, each having leading edge slats 104 and trailing edge flaps 106. Slats 104 and flaps 106 may be extended from the wing 102 to increase a lift generated by the wing 102 when the aircraft 100 flies at lower airspeeds, such as during take-off and landing. An actuation system (not shown) is used to extend and retract the slats 104 and flaps 106 between fully extended and fully retracted positions, as well as other intermediate positions based on aircraft type and design. However, there is limited space available inside the wing 102 for the actuation system as discussed in relation to FIG. 1B. Thus, an aerodynamic surface actuation system, as discussed in relation to FIG. 2, beneficially enables full articulation within the limited space without the disadvantages of conventional methods of penetrating wing spars.

Example Conventional System for Positioning Aerodynamic Surfaces

Figure 1B:
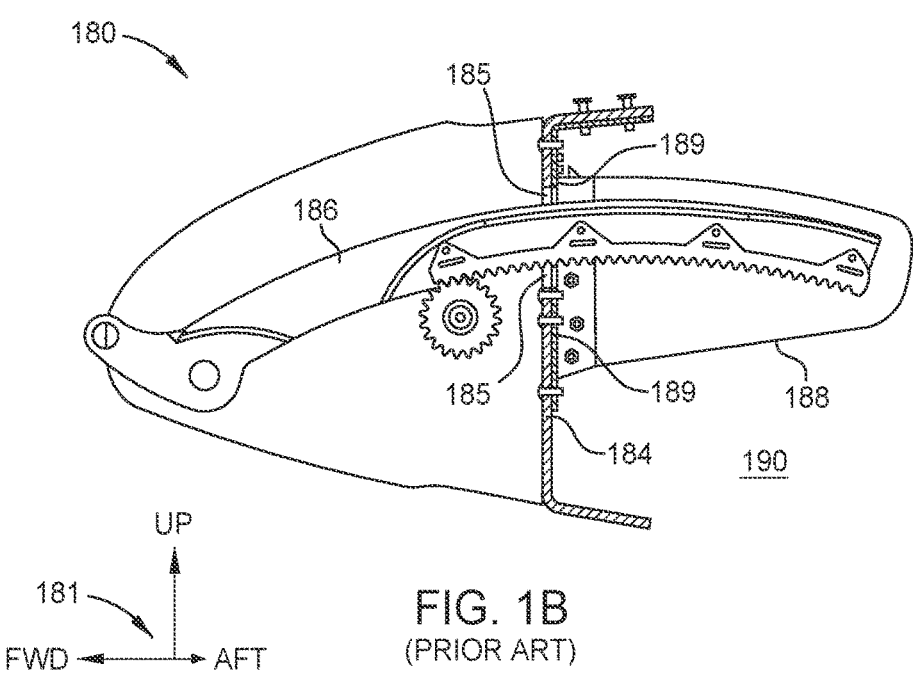
FIG. 1B depicts a side plan view of a conventional system for positioning aerodynamic surfaces.

FIG. 1B depicts a side plan view of a conventional system 180 for positioning aerodynamic surfaces. In particular, FIG. 1B shows the conventional system 180 in a fully retracted position.

The conventional system 180 may be positioned in a leading edge of a wing 102 of the aircraft 100. A single body track 186 attaches to a slat (not shown) at a forward end of the single body track 186 in relation to a coordinate system 181. The single body track 186 has a length long enough to extend the slat a required distance away from the wing and is configured to extend the slat in the forward direction. The single body track 186 is also configured to retract the slat in the aft direction. As shown, when in the fully retracted position the single body track 186 extends through a penetration 185 in the spar 184 and into a main wing box cavity 190. The penetration 185 is required because the length of the single body track 186 is too long to fit in the leading edge of the wing.

Although not shown, the main wing box cavity 190 generally contains fuel and thus the penetration 185 is sealed using a slat can 188. The slat can 188 connects to the spar 184 and extends in an aft direction into the main wing box cavity 190. The slat can 188 further covers an aft portion of the single body track 186 and allows the single body track 186 to extend into the main wing box cavity 190 without contacting the fuel. The spar 184 includes a structural reinforcement 189 in an area surrounding the slat can 188, which reinforces the spar 184 to compensate for the strength lost from the penetration 185. The conventional system 180 further includes a seal (not shown) disposed between the spar 184 and the slat can 188 configured to prevent fuel from intruding into the slat can 188 or the leading edge.

As is clear from the example in FIG. 1B, having the single body track 186 extend into the wing box cavity 190 necessitates many additional structures that add complexity to manufacture and maintenance, as well as additional weight for the reinforcement structures. Further yet, slat can 188 may reduce the effective volume for fuel storage in wing box cavity 190. The systems described herein resolve all of these challenges.

Example System for Positioning an Aerodynamic Surface

Figure 2:
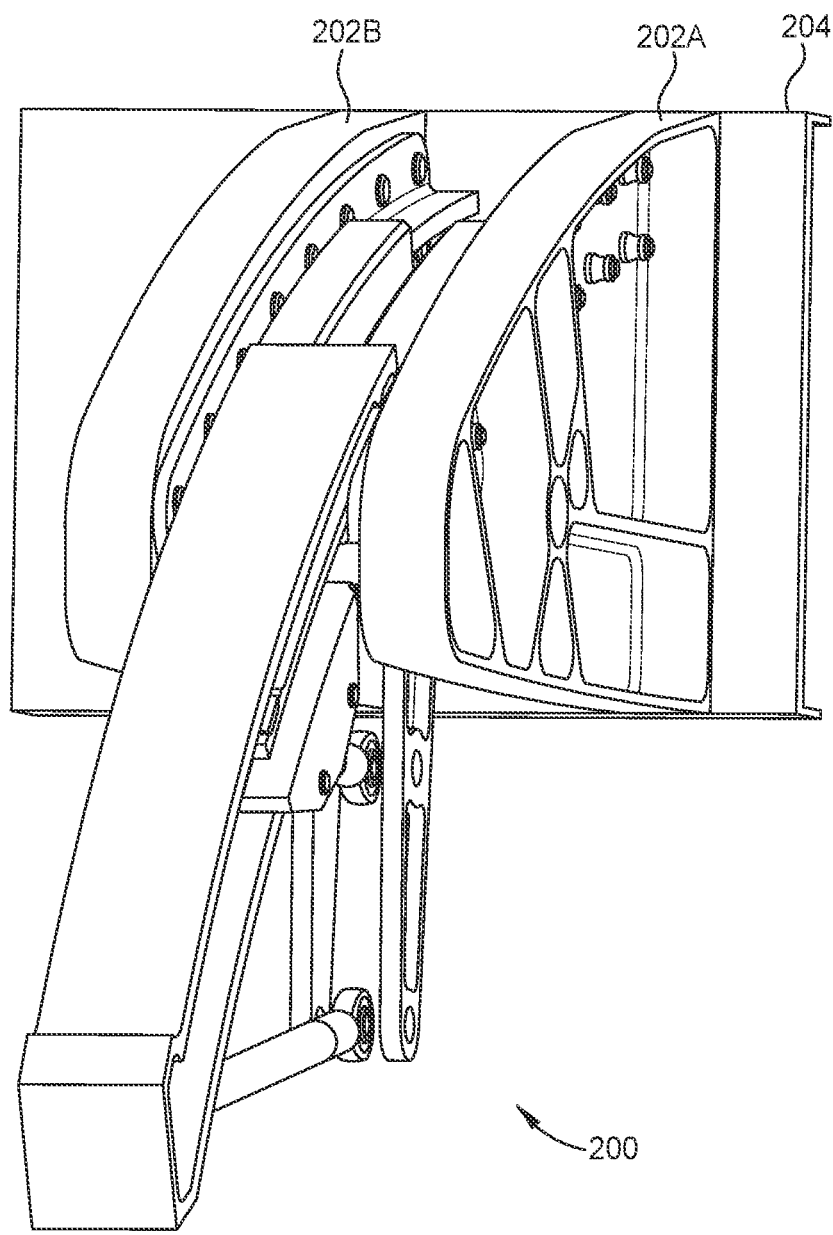
FIG. 2 depicts an isometric view of an aerodynamic surface actuation system, according to an example of the present disclosure.

FIG. 2 depicts an isometric view of an aerodynamic surface actuation system 200, according to an example of the present disclosure. In particular, FIG. 2 shows how the aerodynamic surface actuation system 200 (referred to as system 200) attaches to the aircraft 100 (previously discussed in relation to FIG. 1A). The aerodynamic surface actuation system 200 is shown in a fully extended position.

As shown, the system 200 is mounted to the aircraft 100 via longitudinal structural elements of an aerodynamic structure. The aerodynamic structure comprises the wing 102 of the aircraft 100 as previously discussed in relation to FIG. 1A, and the longitudinal structural elements comprise ribs 202 within the wing 102. In some embodiments, the longitudinal structural elements includes a stringer or a stiffener and the like. Each rib 202A and 202B is mounted to a wing spar 204, which runs a length of the wing 102 and is generally perpendicular to the ribs 202. Further details of the system 200 are discussed in FIG. 3.

Figure 3:
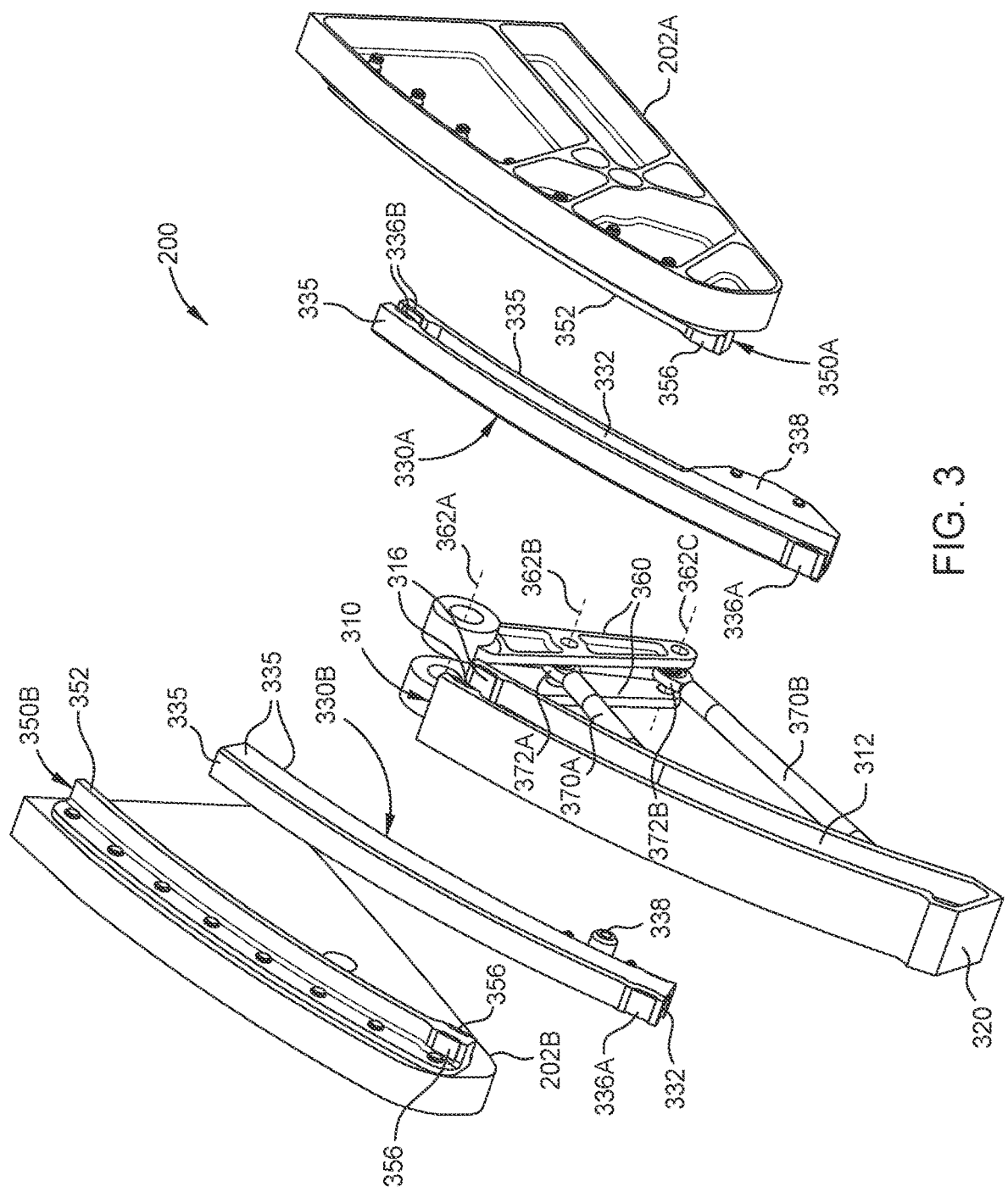
FIG. 3 depicts an exploded isometric view of an aerodynamic surface actuation system, according to another example of the present disclosure.

FIG. 3 depicts an exploded isometric view of the aerodynamic surface actuation system 200, according to another example of the present disclosure. The aerodynamic surface actuation system 200 is shown in a fully extended position.

The aerodynamic surface actuation system 200 comprises a plurality of different "tracks", including a middle track 310, a plurality of intermediate tracks 330, and a plurality of outer tracks 350. Generally, the tracks coordinate to provide a controllable movement of an aerodynamic surface between set positions. In particular, the different tracks 310, 330, and 350 provide a telescoping actuation system to extend or retract an aerodynamic surface (e.g., a slat 104 as discussed in relation to FIGS. 4A and 4B) between various positions.

As shown, the plurality of intermediate tracks 330 includes intermediate tracks 330A and 330B (referred to collectively as intermediate tracks 330). The middle track 310 connects to the aerodynamic surface (not shown) at a forward end 320. When the aerodynamic surface is extended or retracted (also referred to as actuated), the middle track 310 moves along the intermediate tracks 330 and the intermediate tracks 330 move along the plurality of outer tracks 350.

Each of the different tracks 310, 330, and 350 includes a mating feature or surface to engage a respective track. As the tracks 310 and 330 move, one or more of the inner surfaces 312 of the middle track 310 are configured to interface with one or more of the outer surfaces 335 of the intermediate tracks 330. For example, the outer surfaces 335 may slide along the inner surfaces 312 using bearing pads or similar low friction, wear resistant surfaces as an interface. The bearing pads provide a low friction interface between the middle track 310 and each intermediate track 330A and 330B.

In some embodiments, a plurality of inner bearing pads 316 are coupled to the inner surfaces 312 of the middle track 310 and each of the intermediate tracks 330A and 330B comprise at least one outer bearing pad 336A. As shown, the outer bearing pads 336A are coupled to the outer surfaces 335 of the intermediate tracks 330 (an outer bearing pad 336A is obstructed from view in FIG. 3 but is visible in FIGS. 5 and 6). In particular, the outer bearing pads 336A provide a low friction interface between each intermediate track 330A and 330B and an inner surface 312 of the middle track 310. The inner bearing pads 316 provide a low friction interface between the middle track 310 and an outer surface 335 of each intermediate track 330A and 330B.

The plurality of outer tracks 350 are mounted to one or more ribs 202 (or other longitudinal support elements in other embodiments) in an aerodynamic structure. The aerodynamic structure is a wing 102 as previously discussed in relation to FIG. 2. As further shown, the plurality of outer tracks 350 includes outer tracks 350A and 350B. Each outer track 350A and 350B (referred to as outer tracks 350) comprises a flange 352. As the intermediate tracks 330 move, one or more of the inner surfaces 332 of the intermediate tracks 330 are configured to interface with the flange 352 of each outer track 350A and 350B. The inner surfaces 332 may slide along the flanges 352 using bearing pads as an interface, providing a low friction interface between the intermediate tracks 330 the outer tracks 350.

In some embodiments, each of the intermediate tracks 330A and 330B comprise at least one inner bearing pad 336B. As shown, the inner bearing pads 336B are coupled to the inner surfaces 332 of the intermediate tracks 330. In particular, the inner bearing pads 336B provide a low friction interface between the intermediate tracks 330 and the flanges 352 of the outer tracks 350.

An actuator (not shown) controls a position of the tracks 310 and 330 via a plurality of linkages 370. The actuator comprises an actuator arm 360 that connects to the plurality of linkages 370. As shown, the actuator arm 360 includes two mirrored pieces and the plurality of linkages 370 includes a first linkage 370A and a second linkage 370B (referred to as linkages 370). The first linkage 370A connects to a mounting bracket 338 of each intermediate track 330A and 330B via an end fitting 372A such as an eye, hook, or jaw end. The first linkage 370A further connects to the actuator arm 360 via another end fitting 372A (obstructed from view in FIG. 3) at a first linkage axis of rotation 362B. The second linkage 370B connects to a mounting bracket (e.g., a mounting bracket 418 in FIG. 4A), near the forward end 320 of the middle track 310, and to the actuator arm 360 via end fittings 372B, which are similar to the end fittings 372A. The end fittings 372B connect to the actuator arm 360 via a second linkage axis of rotation 362C. Operation of the actuator is further discussed in relation to FIG. 4A.

In some embodiments, the actuator arm 360 may comprise one or more segments or elements. For example, the actuator arm may be a single, solid body. Although the linkages 370 are shown without mounting hardware, various fasteners and bolts may be used to fasten the linkages 370 to the actuator arm 360 and the tracks 310 and 330.

In some embodiments, the tracks 310 and 330 comprise channels. For example, the intermediate tracks 330 include a channel configured to receive the flange 352 of the outer tracks 350. The middle track 310 includes a channel configured to receive the outer surfaces 335 of the intermediate tracks 330. In some embodiments, the inner surfaces 312 and 332 are considered channels. In some embodiments, the tracks 310, 330, and 350 may be made of high strength steel (HSS) and/or a titanium alloy such as Ti-6Al-4V. In some embodiments, the outer tracks 350 are referred to as first tracks, the intermediate tracks 330 are referred to as second tracks, and the middle track 310 is referred to as a third track.

In some embodiments, other mechanisms are used instead of the bearing pads to create the low friction interfaces. For example, different coatings such as polytetrafluoroethylene (PTFE), chrome, electroless nickel with boron nitride, greases, lubricants, compositions containing silicone, or hard face coatings such as tungsten-carbide cobalt may be used on any one of the surfaces 312, 332, and 335 and the flanges 352. The interfaces may also include bearings.

Although the aerodynamic surface of the embodiment described in FIG. 3 is a slat, in other embodiments, the aerodynamic surface may be a flap, such as a trailing edge flap of the wing.

FIGS. 4A and 4B depict side plan views of the aerodynamic surface actuation system 200 in a fully extended and a fully retracted position, respectively, according to another example of the subject disclosure. In particular, FIGS. 4A and 4B show how the aerodynamic surface actuation system 200 moves as the aerodynamic surface is retracted. The outer track 350B and the rib 202B are omitted for illustrative purposes.

The actuator rotates the actuator arm 360 about the axis of rotation 362A to adjust the position of the tracks 310 and 330 and thus the position of the aerodynamic surface (e.g., the slat 104). As previously discussed, the linkages 370 connect the actuator arm 360 to the tracks 310 and 330. The first linkage 370A connects to the actuator arm 360 at a first distance (L1) from the axis of rotation 362A of the actuator arm 360. The second linkage 370B connects to the actuator arm 360 at a second distance (L2) from the axis of rotation 362A. When the actuator arm 360 rotates, it pushes or pulls on the linkages 370, which in turn push or pull on the tracks 310 and 330. As shown, the actuator arm 360 rotates clockwise to retract tracks 310 and 330 and thus the slat 104 and counter-clockwise to extend tracks 310 and 330 and thus the slat 104. In the depicted embodiment, the actuator is further configured to move the tracks 310 and 330 along a curvilinear path 428 between a plurality of set positions. The plurality of set positions comprises a fully extended position, a fully retracted position, and positions in between the fully extended and fully retracted positions. In other embodiments, the curvilinear path may be a linear path or another design.

Figure 4C:
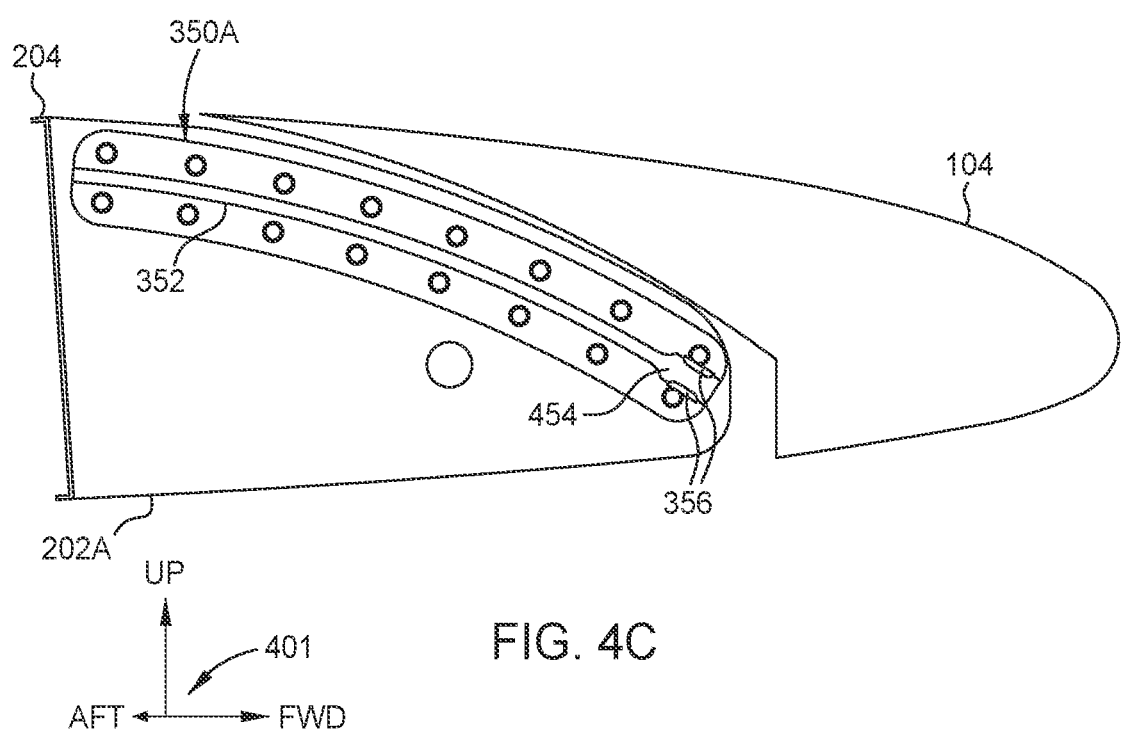
FIG. 4C depicts a side plan view of an outer track of the aerodynamic surface actuation system according to the example embodiment from FIGS. 4A and 4B of the present disclosure.

As further shown in FIG. 4A, each of tracks 310, 330, and 350 further comprises a guide to guide the movement of tracks 330 and 350 as the slat 104 is extended or retracted. For example, the middle track 310 includes an inner guide 414 at an aft end as referenced in relation to a coordinate system 401. The inner guide 414 may be considered part of the inner surfaces 312. The intermediate tracks 330 include an outer guide 434A at a forward end (e.g., FWD in the coordinate system 401) and an inner guide 434B at an aft end. The outer guide 434A may be considered part of the outer surfaces (e.g., the outer surfaces 335 in FIG. 3) of the intermediate tracks 330 and the inner guide 434B may be considered part of the inner surfaces 332. The guides 414 and 434 provide a surface to engage and guide the surfaces 312, 332, and 335 of the tracks 310 and 330 and the flanges 352 of the outer tracks 350. For example, the inner guide 414 of the middle track 310 includes the inner bearing pads 316 and interfaces with the outer surfaces 335 of the intermediate tracks 330. The outer guide 434A of the intermediate tracks 330 includes the outer bearing pads 336A and interfaces with the inner surfaces 312 of the middle track 310. The inner guide 434B of the intermediate tracks 330 includes the inner bearing pads 336B and interfaces with the flanges 352 of the outer tracks 350. An outer guide 454 of the outer tracks 350 is discussed in relation to FIG. 4C.

The aerodynamic surface actuation system 200 is secured to the aircraft 100 via the ribs 202, which mount to the wing spar 204. As shown in FIG. 4B, when the aerodynamic surface actuation system 200 is in the fully retracted position, no part of the aerodynamic surface actuation system 200 extends beyond the wing spar 204. Thus, the aerodynamic surface actuation system 200 fits entirely within a volume created by the ribs 202, the wing spar 204, and the slats 104. This beneficially avoids the need for penetrations in the wing spar 204.

Some embodiments further include a position sensor such as an encoder or angular sensor to sense a position or angle of the tracks 330 and 350 or of the aerodynamic surface. The position sensor may be part of the actuator or mounted to the actuator arm 360. In some embodiments, the position sensor may interface with a system controller to control the actuator or actuator arm 360 such as described in relation to FIG. 8. For example, the system controller may control the position or rotation of the actuator or actuator arm 360 using data from the position sensor.

In some embodiments, the guides 414 and 434 limit the extension of the tracks 310 and 330. For example, if the inner guide 414 of the middle track 310 is a reduction of a cross-section of the inner surfaces 312, then the inner guide 414 will engage the outer guide 434A of the intermediate tracks 330 when the tracks 310 and 330 are in a fully extended position (not shown). If the inner guide 434B is a reduction of a cross-section of the inner surfaces 332, then the inner guide 434B will engage the outer guide 454 of the outer tracks 350 when the intermediate track 330 is in a fully extended position (not shown). In some embodiments, the guides 414, 434, and 454 do not engage each other when the tracks 310 and 330 are in the fully extended position and instead are a fail-safe in the event where the linkages 370 or the actuator arm 360 fail. In some embodiments, more or fewer guides (e.g., guides 414, 434A, 434B, and 454) may be used.

FIG. 4C depicts a side plan view of the outer track 350A of the aerodynamic surface actuation system 200, according to the example embodiment from FIGS. 4A and 4B of the subject disclosure. In particular, FIG. 4C shows the outer track 350A mounted to the rib 202A and the slat 104 in a fully retracted position. Other parts of the aerodynamic surface actuation system 200 are omitted for illustrative purposes. Note that although the discussion in FIG. 4C is directed to the outer track 350A, the same features apply to the outer track 350B (discussed in relation to FIG. 5).

As shown, the flange 352 of the outer track 350A includes the outer guide 454 at the forward end, which provides a surface to engage and guide the inner surfaces 332 of the intermediate track 330A. For example, the outer guide 454 of the outer track 350A includes the outer bearing pads 356 and interfaces with the inner surfaces 332 of the intermediate track 330A (previously discussed in relation to FIG. 4A). The outer bearing pads 356 are similar to the bearing pads 316 and 336 as previously discussed in relation to FIG. 3.

In some embodiments, the outer guide 454 limits the extension of the intermediate tracks 330. For example, the outer guide 454 is a protrusion of the flanges 352 of the outer tracks 350. The outer guide 454 will engage the inner guide 434B of the intermediate tracks 330 when the tracks 310 and 330 are in a fully extended position (not shown) or when the linkages 370 or actuator arm 360 fail as discussed in relation to FIGS. 4A and 4B.

As shown in FIGS. 4A-4C, the tracks 310, 330, and 350 have a generally curved shape to facilitate moving the tracks 310 and 330 along the curvilinear path 428. In particular, the surfaces 312, 332, and 335, the flanges 352, and the guides 414, 434, and 454 may have a generally curved shape. In other embodiments, other shapes are possible including a linear shape.

In some embodiments, the bearing pads 316, 336, and 356 are made of polytetrafluoroethylene (PTFE) or polyether ether ketone (PEEK) and the like. In some embodiments, the bearing pads 316, 336, and 356 are bonded to the tracks 310, 330, and 350.

FIG. 5 depicts a cross-sectional view of an aerodynamic surface actuation system 200 according to the example embodiment from FIG. 4B of the subject disclosure. In particular, FIG. 5 shows a cross-sectional slice of the aerodynamic surface actuation system 200 and does not show features beyond the perspective of the slice (e.g., the forward end 320 of the middle track 310 as discussed in relation to FIGS. 4A and 4B) or the slat 104. Reference numerals are shown only on the left side of FIG. 5 for features having the same reference numeral that are mirrored about a symmetry line 590. For example, the mounting bracket 418 is labeled on the left side but not the right side because both use the reference numeral 418.

As shown, the middle track 310 comprises an I-shaped cross-section. Each intermediate track 330A and 330B comprises a C-shaped cross-section. As shown, each intermediate track 330A and 330B also comprises a cross-section of the mounting bracket 338. Further, each outer track 350A and 350B comprises a T-shaped cross-section. As previously discussed in relation to FIG. 3, the outer track 350B is a mirror of the outer track 350A and thus includes similar features. FIG. 5 further shows a stack-up of the surfaces 312, 332, and 335; the bearing pads 336A and 356; and the guides 434A and 454.

Example Low Friction Interface Between the Middle and Intermediate Tracks

FIG. 6 depicts the bearing pads 316 and 336A of the middle track 310 and the intermediate track 330B, respectively, according to another example of the subject disclosure. In particular, FIG. 6 shows how the tracks 310 and 330B move about another as the slat 104 is extended.

The intermediate track 330B is shown separate from the middle track 310 (e.g., not assembled) for illustrative purposes. The mounting bracket 338 and the inner bearing pads 336B of the intermediate track 330B (discussed in relation to FIG. 4A) are not shown.

As shown, circles 680 illustrate how the inner bearing pads 316 of the middle track 310 move along the outer surfaces 335 of the intermediate track 330B. A circle 680A shows the inner guide 414 and the inner surfaces 312, which include a surface of the inner bearing pads 316. A circle 680B shows the inner surface 312 of the inner bearing pads 316 interfacing with (e.g., sliding on) the outer surface 335 of the intermediate track 330B, including a direction in which the inner bearing pads 316 move when the tracks 310 and 330B are extended.

Circles 682 illustrate how the outer bearing pads 336A of the intermediate track 330B move along the inner surface 312 of the middle track 310. A circle 682A shows the outer guide 434A and the outer surfaces 335, which include the outer bearing pads 336A. A circle 682B shows the outer surface 335 of the outer bearing pads 336A interfacing with the inner surface 312 of the middle track 310, including a direction in which the bearing pads 336A move when the tracks 310 and 330B are extended.

Although not shown, tracks 310 and 330B move similarly, but in opposite directions, when the slat 104 is retracted. The middle track 310 and the intermediate track 330A, which are also not shown, move similarly to tracks 310 and 330B.

Examples of Methods for Positioning an Aerodynamic Surface

Figure 7:
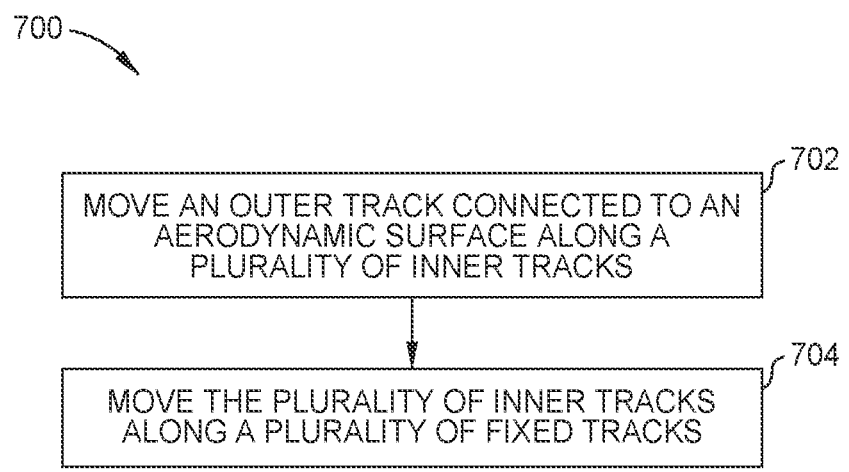
FIG. 7 depicts an example method of controlling a position of an aerodynamic surface using an aerodynamic surface actuation system, according to another example of the present disclosure.

FIG. 7 depicts an example method 700 of controlling the position of an aerodynamic surface using an aerodynamic surface actuation system, according to another example of the present disclosure.

Method 700 begins at step 702 with moving a middle track connected to an aerodynamic surface along a plurality of intermediate tracks, wherein one or more inner surfaces of the middle track interface with one or more outer surfaces of the plurality of intermediate tracks, as described above with respect to FIGS. 3, 4A, and 4B.

Method 700 then proceeds to step 704 with moving the plurality of intermediate tracks along a plurality of outer tracks, wherein each outer track of the plurality of outer tracks comprises comprising a flange configured to interface with one or more inner surfaces of the plurality of intermediate tracks, as described above with respect to FIGS. 3 and 4A-4C.

Some embodiments of method 700 further include moving an actuator to control a position of the middle track and a position of the plurality of intermediate tracks via a plurality of linkages, as described above with respect to FIGS. 3, 4A, and 4B. Some embodiments further include sensing a position of the middle track, the plurality of outer tracks, or the aerodynamic surface using a position sensor; and controlling the actuator using a processing system, as described above with respect to FIGS. 4A, 4B, and 8. In some embodiments, the position sensor is an encoder or angular sensor.

In some embodiments of method 700, the actuator is configured to move the middle track and the plurality of intermediate tracks along a curvilinear path between a plurality of set positions, such as described above with respect to FIGS. 4A and 4B. For example, the plurality of set positions comprises a fully extended position, a fully retracted position, and positions in between the fully extended and fully retracted positions.

In some embodiments of method 700, the aerodynamic surface is a slat of an aircraft wing, such as described above with respect to FIGS. 1A and 3.

In some embodiments of method 700, the aerodynamic surface is a flap of an aircraft wing, as described above with respect to FIGS. 1A and 3.

Example Processing System

Figure 8:
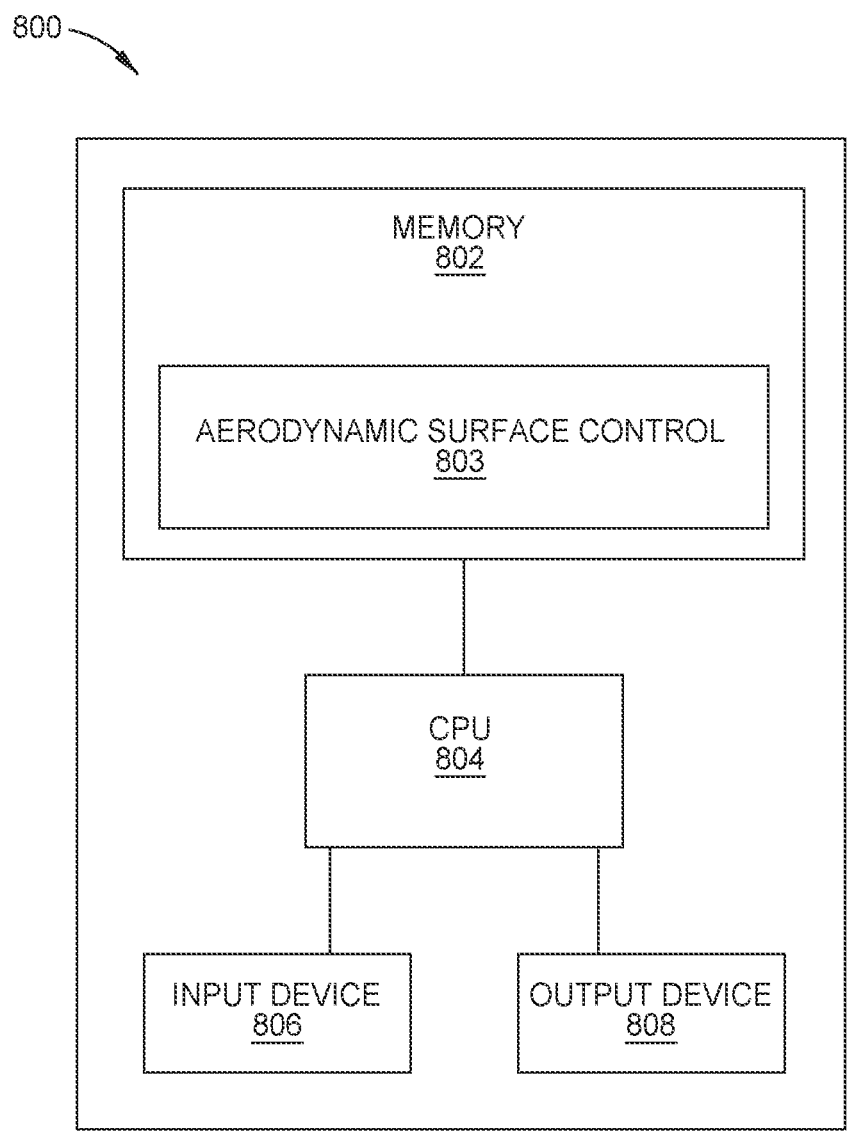
FIG. 8 depicts a schematic view of an example system controller that can be used according to the systems and methods described herein.

FIG. 8 depicts a schematic view of an example system controller 800 that can be used according to the systems and methods described herein. The system controller 800 includes a processor 804 (e.g., a central processing unit (CPU)) in data communication with a memory 802, an input device 806, and an output device 808. Although described separately, it is to be appreciated that functional blocks described with respect to the system controller 800 need not be separate structural elements. For example, the processor 804 and memory 802 is embodied in a single chip. The processor 804 can be a general purpose processor, a digital signal processor ("DSP"), an application specific integrated circuit ("ASIC"), a field programmable gate array ("FPGA") or other programmable logic device, discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration.

The processor 804 can be coupled, via one or more buses, to read information from or write information to memory 802. The processor may additionally, or in the alternative, contain memory, such as processor registers. The memory 802 can include processor cache, including a multi-level hierarchical cache in which different levels have different capacities and access speeds. The memory 802 can also include random access memory (RAM), other volatile storage devices, or non-volatile storage devices. The storage can include hard drives, flash memory, etc. Memory 802 can also include a computer program product embodied on memory 802 comprising code such as an aerodynamic surface control application 803, which is used to control the actuator as described in FIGS. 3, 4A, and 4B. Aerodynamic surface control application 803 may be code that can be executed by processor 804. In various instances, the memory is referred to as a computer-readable storage medium or a non-transitory computer-readable storage medium. The computer-readable storage medium is a non-transitory device capable of storing information, and is distinguishable from computer-readable transmission media such as electronic transitory signals capable of carrying information from one location to another. The non-transitory computer readable medium includes computer-executable instructions that, when executed by a processing system, cause the processing system to perform a method, as described in relation to FIGS. 3, 4A, and 4B, including moving a middle track connected to an aerodynamic surface along a plurality of intermediate tracks, wherein one or more inner surfaces of the middle track interface with one or more outer surfaces of the plurality of intermediate tracks; and moving the plurality of intermediate tracks along a plurality of outer tracks, wherein each outer track of the plurality of outer tracks comprises comprising a flange configured to interface with one or more inner surfaces of the plurality of intermediate tracks. In some embodiments, the method performed by the processing system includes moving an actuator to control a position of the middle track and a position of the plurality of intermediate tracks via a plurality of linkages. Computer-readable medium as described herein may generally refer to a computer-readable storage medium or computer-readable transmission medium.

The processor 804 also may be coupled to an input device 806 and an output device 808 for, respectively, receiving input from and providing output to the system controller 800. Suitable input devices include, but are not limited to a video camera (possibly coupled with video processing software to, e.g., detect a position of the middle track, the plurality of outer tracks, or the aerodynamic surface), an encoder (e.g., an optical or magnetic, capacitive, or inductive encoder), a resolver, a potentiometer, an angle sensor, an accelerometer, a gyroscope, an inertial measurement unit, or a motion detector. The input device 806 includes a position sensor such as an encoder or angle position sensor as discussed in relation to FIGS. 4A and 4B. Suitable output devices include, but are not limited to, the actuator as discussed in relation to FIGS. 3, 4A, and 4B.

Aspects of the present disclosure have been described above with reference to specific embodiments. Persons skilled in the art, however, will understand that various modifications and changes may be made thereto without departing from the broader spirit and scope of the present disclosure as set forth in the appended claims. The foregoing description and drawings are, accordingly, to be regarded in an illustrative rather than a restrictive sense.

EXAMPLE CLAUSES

Implementation examples are described in the following numbered clauses:

Clause 1. An aerodynamic surface actuation system, comprising a middle track connected to an aerodynamic surface and configured to move along a plurality of intermediate tracks, wherein one or more inner surfaces of the middle track are configured to interface with one or more outer surfaces of the plurality of intermediate tracks; a plurality of outer tracks, each comprising a flange and configured to interface with one or more inner surfaces of the plurality of intermediate tracks; and an actuator configured to control a position of the middle track and a position of the plurality of intermediate tracks via a plurality of linkages.

Clause 2. The aerodynamic surface actuation system of Clause 1, wherein the aerodynamic surface comprises a slat or a flap of an aircraft wing.

Clause 3. The aerodynamic surface actuation system of any one of Clauses 1-2, wherein the middle track comprises a plurality of bearing pads configured to provide a low friction interface between the middle track and the plurality of intermediate tracks.

Clause 4. The aerodynamic surface actuation system of any one of Clauses 1-3, wherein each respective intermediate track of the plurality of intermediate tracks comprises at least one inner bearing pad configured to provide a first low friction interface between the respective intermediate track and a flange of a respective outer track of the plurality of outer tracks; and at least one outer bearing pad configured to provide a second low friction interface between the respective intermediate track and an inner surface of the middle track, and each respective intermediate track of the plurality of intermediate tracks is configured to move along at least one outer track of the plurality of outer tracks.

Clause 5. The aerodynamic surface actuation system of any one of Clauses 1-4, wherein the plurality of outer tracks are mounted to one or more longitudinal structural elements in an aerodynamic structure.

Clause 6. The aerodynamic surface actuation system of Clause 5, wherein the aerodynamic structure comprises a wing of an aircraft, and the one or more longitudinal structural elements comprise ribs within the wing.

Clause 7. The aerodynamic surface actuation system of any one of Clauses 1-6, wherein the actuator comprises an actuator arm, a first linkage of the plurality of linkages is connected to the actuator arm at a first distance from an axis of rotation of the actuator arm and connected to at least two intermediate tracks of the plurality of intermediate tracks, and a second linkage of the plurality of linkages is connected to the actuator arm at a second distance from the axis of rotation of the actuator arm and connected to the middle track.

Clause 8. The aerodynamic surface actuation system of any one of Clauses 1-7, wherein the middle track comprises an I-shaped cross-section, each intermediate track of the plurality of intermediate tracks comprises a C-shaped cross-section, and each outer track of the plurality of outer tracks comprises a T-shaped cross-section.

Clause 9. The aerodynamic surface actuation system of any one of Clauses 1-8, wherein when in a fully retracted position, no part of the aerodynamic surface actuation system extends beyond a wing spar.

Clause 10. The aerodynamic surface actuation system of any one of Clauses 1-9, wherein the actuator is configured to move the middle track and the plurality of intermediate tracks along a curvilinear path between a plurality of set positions.

Clause 11. The aerodynamic surface actuation system of any one of Clauses 1-10, further comprising a position sensor configured to sense a position of the middle track, the plurality of outer tracks, or the aerodynamic surface; and a processing system configured to control the actuator.

Clause 12. The aerodynamic surface actuation system of Clause 11, wherein the position sensor is an encoder or angular sensor.

Clause 13. An aerodynamic surface actuation system, comprising a plurality of first tracks, wherein each first track of the plurality of first tracks comprises a flange, and is mounted to a longitudinal structural element in an aerodynamic structure; a plurality of second tracks, wherein each respective second track of the plurality of second tracks comprises a channel configured to receive a flange of at least one first track of the plurality of first tracks, comprises one or more inner bearing pads configured to provide a low friction interface between the channel of the respective second track and the flange of the at least one first track, and comprises one or more outer bearing pads configured to provide a low friction interface between the respective second track and a third track; and the third track connected to an aerodynamic surface and configured to interface with and move along a plurality of outer surfaces of at least two second tracks of the plurality of second tracks, wherein the third track comprises one or more inner bearing pads configured to provide low friction interfaces between the third track and the at least two second tracks.

Clause 14. The aerodynamic surface actuation system of Clause 13, wherein the aerodynamic surface comprises a slat or a flap of an aircraft wing.

Clause 15. The aerodynamic surface actuation system of any one of Clauses 13-14, wherein the aerodynamic structure comprises a wing of an aircraft, and the longitudinal structural element comprises a rib within the wing.

Clause 16. The aerodynamic surface actuation system of any one of Clauses 13-15, further comprising an actuator arm configured to control a position of the third track and a position of the plurality of second tracks via a plurality of linkages, wherein a first linkage of the plurality of linkages is connected to the actuator arm at a first distance from an axis of rotation of the actuator arm and connected to at least two second tracks of the plurality of second tracks, and wherein a second linkage of the plurality of linkages is connected to the actuator arm at a second distance from the axis of rotation of the actuator arm and connected to the third track.

Clause 17. The aerodynamic surface actuation system of any one of Clauses 13-16, wherein the third track comprises an I-shaped cross-section, each second track of the plurality of second tracks comprises a C-shaped cross-section, and each first track of the plurality of first tracks comprises a T-shaped cross-section.

Clause 18. The aerodynamic surface actuation system of any one of Clauses 13-17, wherein when in a fully retracted position, no part of the aerodynamic surface actuation system extends beyond a wing spar.

Clause 19. The aerodynamic surface actuation system of Clause 16, wherein the actuator arm is configured to move the third track and the plurality of second tracks along a curvilinear path between a plurality of set positions.

Clause 20. The aerodynamic surface actuation system of Clause 16, further comprising a position sensor configured to sense a position of the third track, the plurality of second tracks, or the aerodynamic surface; and a processing system configured to control the actuator arm.

Clause 21. The aerodynamic surface actuation system of Clause 20, wherein the position sensor is an encoder or angular sensor.

Clause 22. A method of actuating an aerodynamic surface, comprising moving a middle track connected to an aerodynamic surface along a plurality of intermediate tracks, wherein one or more inner surfaces of the middle track interface with one or more outer surfaces of the plurality of intermediate tracks; and moving the plurality of intermediate tracks along a plurality of outer tracks, wherein each outer track of the plurality of outer tracks comprises comprising a flange configured to interface with one or more inner surfaces of the plurality of intermediate tracks.

Clause 23. The method of Clause 22, further comprising moving an actuator to control a position of the middle track and a position of the plurality of intermediate tracks via a plurality of linkages.

Clause 24. The method of Clause 23, wherein the actuator is configured to move the middle track and the plurality of intermediate tracks along a curvilinear path between a plurality of set positions.

Clause 25. The method of Clause 24, wherein the plurality of set positions comprises a fully extended position, a fully retracted position, and positions in between the fully extended and fully retracted positions.

Clause 26. The method of any one of Clauses 22-25, wherein the aerodynamic surface is a slat or a flap of an aircraft wing.

Clause 27. The method of Clause 23, further comprising sensing a position of the middle track, the plurality of outer tracks, or the aerodynamic surface using a position sensor; and controlling the actuator using a processing system.

Clause 28. The method of Clause 27, wherein the position sensor is an encoder or angular sensor.

Clause 29. A processing system, comprising a memory comprising computer-executable instructions; and one or more processors configured to execute the computer-executable instructions and cause the processing system to perform a method in accordance with any one of Clauses 22-28.

Clause 30. A processing system, comprising means for performing a method in accordance with any one of Clauses 22-28.

Clause 31. A non-transitory computer-readable medium comprising computer-executable instructions that, when executed by one or more processors of a processing system, cause the processing system to perform a method in accordance with any one of Clauses 22-28.

Clause 32. A computer program product embodied on a computer-readable storage medium comprising code for performing a method in accordance with any one of Clauses 22-28.

ADDITIONAL CONSIDERATIONS

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An aerodynamic surface actuation system, comprising:
   a middle track connected to an aerodynamic surface and configured to move along a plurality of intermediate tracks, wherein one or more inner surfaces of the middle track are configured to interface with one or more outer surfaces of the plurality of intermediate tracks;
   a plurality of outer tracks, each comprising a flange and configured to interface with one or more inner surfaces of the plurality of intermediate tracks; and
   an actuator comprising an actuator arm and configured to control a position of the middle track and a position of the plurality of intermediate tracks via a plurality of linkages, wherein the plurality of linkages comprise:
   a first linkage connected to the actuator arm and connected to at least two intermediate tracks of the plurality of intermediate tracks; and
   a second linkage connected to the actuator arm and connected to the middle track.

2. The aerodynamic surface actuation system of claim 1, wherein the aerodynamic surface comprises a slat or a flap of an aircraft wing.

3. The aerodynamic surface actuation system of claim 1, wherein the middle track comprises a plurality of bearing pads configured to provide an interface between the middle track and the plurality of intermediate tracks.

4. The aerodynamic surface actuation system of claim 1, wherein:
   each respective intermediate track of the plurality of intermediate tracks comprises:
      at least one inner bearing pad configured to provide a first interface between the respective intermediate track and a flange of a respective outer track of the plurality of outer tracks; and
      at least one outer bearing pad configured to provide a second interface between the respective intermediate track and an inner surface of the middle track, and
   each respective intermediate track of the plurality of intermediate tracks is configured to move along at least one outer track of the plurality of outer tracks.

5. The aerodynamic surface actuation system of claim 1, wherein the plurality of outer tracks are mounted to one or more longitudinal structural elements in an aerodynamic structure.

6. The aerodynamic surface actuation system of claim 5, wherein:
   the aerodynamic structure comprises a wing of an aircraft, and
   the one or more longitudinal structural elements comprise ribs within the wing.

7. The aerodynamic surface actuation system of claim 1, wherein:
the first linkage of the plurality of linkages is connected to the actuator arm at a first distance from an axis of rotation of the actuator arm, and
the second linkage of the plurality of linkages is connected to the actuator arm at a second distance from the axis of rotation of the actuator arm.

8. The aerodynamic surface actuation system of claim 1, wherein:
the middle track comprises an I-shaped cross-section,
each intermediate track of the plurality of intermediate tracks comprises a C-shaped cross-section, and
each outer track of the plurality of outer tracks comprises a T-shaped cross-section.

9. The aerodynamic surface actuation system of claim 1, wherein when in a fully retracted position, no part of the aerodynamic surface actuation system extends beyond a wing spar.

10. The aerodynamic surface actuation system of claim 1, wherein the actuator is configured to move the middle track and the plurality of intermediate tracks along a curvilinear path between a plurality of set positions.

11. The aerodynamic surface actuation system of claim 1, further comprising:
a position sensor configured to sense a position of the middle track, the plurality of outer tracks, or the aerodynamic surface; and
a processing system configured to control the actuator.

12. An aerodynamic surface actuation system, comprising:
a plurality of first tracks, wherein each first track of the plurality of first tracks:
comprises a flange, and
is mounted to a longitudinal structural element in an aerodynamic structure;
a plurality of second tracks, wherein each respective second track of the plurality of second tracks:
comprises a channel configured to receive a flange of at least one first track of the plurality of first tracks,
comprises one or more inner bearing pads configured to provide an interface between the channel of the respective second track and the flange of the at least one first track, and
comprises one or more outer bearing pads configured to provide an interface between the respective second track and a third track; and
the third track connected to an aerodynamic surface and configured to interface with and move along a plurality of outer surfaces of at least two second tracks of the plurality of second tracks, wherein the third track comprises one or more inner bearing pads configured to provide interfaces between the third track and the at least two second tracks; and
an actuator arm configured to control a position of the third track and a position of the plurality of second tracks via a plurality of linkages,
wherein a first linkage of the plurality of linkages is connected to the actuator arm and connected to at least two second tracks of the plurality of second tracks, and
wherein a second linkage of the plurality of linkages is connected to the actuator arm and connected to the third track.

13. The aerodynamic surface actuation system of claim 12, wherein:
the first linkage is connected to the actuator arm at a first distance from an axis of rotation of the actuator arm, and
the second linkage of the plurality of linkages is connected to the actuator arm at a second distance from the axis of rotation of the actuator arm.

14. The aerodynamic surface actuation system of claim 12, wherein when in a fully retracted position, no part of the aerodynamic surface actuation system extends beyond a wing spar.

15. The aerodynamic surface actuation system of claim 12, wherein the actuator arm is configured to move the third track and the plurality of second tracks along a curvilinear path between a plurality of set positions.

16. A method of actuating an aerodynamic surface, comprising:
moving, using an actuator, a middle track connected to an aerodynamic surface along a plurality of intermediate tracks, wherein one or more inner surfaces of the middle track interface with one or more outer surfaces of the plurality of intermediate tracks; and
moving, using the actuator, the plurality of intermediate tracks along a plurality of outer tracks,
wherein each outer track of the plurality of outer tracks comprises a flange configured to interface with one or more inner surfaces of the plurality of intermediate tracks,
wherein the actuator moves the middle track and moves the intermediate tracks via an actuator arm and a plurality of linkages,
wherein a first linkage connected to the actuator arm and connected to at least two intermediate tracks of the plurality of intermediate tracks, and
wherein a second linkage connected to the actuator arm and connected to the middle track.

17. The method of claim 16, wherein the actuator is configured to move the middle track and the plurality of intermediate tracks along a curvilinear path between a plurality of set positions.

18. The method of claim 17, wherein the plurality of set positions comprises a fully extended position, a fully retracted position, and positions in between the fully extended and fully retracted positions.

19. The method of claim 16, further comprising:
sensing a position of the middle track, the plurality of outer tracks, or the aerodynamic surface using a position sensor; and
controlling the actuator using a processing system.

20. The method of claim 16, wherein the first linkage is connected to the actuator arm at a first distance from an axis of rotation of the actuator arm, and wherein the second linkage of the plurality of linkages is connected to the actuator arm at a second distance from the axis of rotation of the actuator.

* * * * *